(12) United States Patent
Musser

(10) Patent No.: US 9,167,804 B2
(45) Date of Patent: Oct. 27, 2015

(54) RECIRCULATING FISH BROODING AND FILTRATION SYSTEM

(71) Applicant: John Musser, DeSoto, TX (US)

(72) Inventor: John Musser, DeSoto, TX (US)

( * ) Notice: Subject to any disclaimer, the term of this patent is extended or adjusted under 35 U.S.C. 154(b) by 131 days.

(21) Appl. No.: 13/906,194

(22) Filed: May 30, 2013

(65) Prior Publication Data

US 2013/0319342 A1 Dec. 5, 2013

Related U.S. Application Data

(60) Provisional application No. 61/654,001, filed on May 31, 2012.

(51) Int. Cl.
*A01K 63/04* (2006.01)
*A01K 61/00* (2006.01)

(52) U.S. Cl.
CPC ............. *A01K 63/045* (2013.01); *A01K 61/008* (2013.01)

(58) Field of Classification Search
CPC .................................................. A01K 63/045
USPC ..................................................... 119/226, 227
See application file for complete search history.

(56) References Cited

U.S. PATENT DOCUMENTS

| 3,661,262 | A  | * | 5/1972  | Sanders    | 210/167.22 |
|-----------|----|---|---------|------------|------------|
| 5,054,424 | A  | * | 10/1991 | Sy         | 119/260    |
| 5,961,831 | A  | * | 10/1999 | Lee et al. | 210/614    |
| 7,316,776 | B2 | * | 1/2008  | Kieselbach | 210/167.22 |
| 7,604,734 | B2 | * | 10/2009 | Smith      | 210/167.22 |
| 8,132,534 | B2 | * | 3/2012  | Arita et al. | 119/259  |
| 2006/0102538 | A1 | * | 5/2006 | Chang      | 210/169    |
| 2006/0163131 | A1 | * | 7/2006 | Kieselbach | 210/169    |
| 2009/0293812 | A1 | * | 12/2009 | Arita et al. | 119/226 |

* cited by examiner

*Primary Examiner* — Kristen C Hayes
(74) *Attorney, Agent, or Firm* — Gardere Wynne Sewell LLP

(57) ABSTRACT

Embodiments disclosed herein disclose a fish brooding and filtration system. The system includes a brooding tank configured to contain water and fish for breeding. The brooding tank is in fluid communication a filtration tank, which is configured to extract nitrites from the water circulating through the system. A pump circulates the water through at least one conduit and an injector that receives a flow of water generated by the pump and draws air into the injector. The injector is further operable to inject a mixture of the drawn air and the water into the brooding tank.

16 Claims, 7 Drawing Sheets

RECIRCULATING FISH BROODING AND FILTRATION SYSTEM

PRIORITY CLAIM

This application claims priority to U.S. Provisional Patent Application Ser. No. 61/654,001, filed May 31, 2012, the disclosure of which is hereby incorporated by reference.

BACKGROUND

Aquaponics is a sustainable food production process that symbiotically combines breeding and raising aquatic animals for food and using the fish water in connection with growing plant life. Effluents accumulate in the water sustaining the aquatic animals. These effluents may be filtered out and the by-products may be used by the plant life as vital nutrients, resulting in more plentiful harvests and faster growth times. In some aquaponic systems, the effluents may be converted using a biological process. Aquaponic systems are environmentally friendly and may provide impoverished regions with food sources that would otherwise be unavailable.

SUMMARY

Embodiments disclosed herein disclose a fish brooding and filtration system. The system includes a brooding tank configured to contain water and fish for breeding. The brooding tank is in fluid communication a filtration tank, which is configured to extract nitrites from the water circulating through the system. A pump circulates the water through at least one conduit and an injector that receives a flow of water generated by the pump. The flow of water causes air to be drawn into the injector. The injector is further operable to inject a mixture of the drawn air and the water into the brooding tank.

Technical advantages of the system include a fully operational fish brooding and filtration system that may be inexpensive in that water may be circulated and oxygenated using only a single low power pump.

Further technical advantages include a three stage biofiltration system that may convert harmful nitrites into beneficial nitrates, which may be used to fertilize plants for sustainability purposes.

BRIEF DESCRIPTION OF THE DRAWINGS

A more complete understanding of the invention may be obtained by reference to the following drawings.

DETAILED DESCRIPTION OF THE DRAWINGS

A recirculating fish brooding and filtration system is disclosed. The system is easy to assemble, disassemble, operate, and maintain. The system is also economical to ship and extremely cost efficient in operation. Using the recirculating fish brooding and filtration system of the present disclosure enables the user to successfully breed and harvest fish in a confined space. In certain embodiments, the user may breed and harvest tilapia. The filtration functionality of the system functions to transform waste from the fish brooding operation into nutrient rich fertilizer that may have a variety of uses including for gardening. In addition, the water from the system may be used to water plants. Together, the fish from the brooding system, the nutrient rich water created by the fish habitat and the filtering operations, and the fertilizer may be used for environmentally conscious sustainability.

Figure 1:
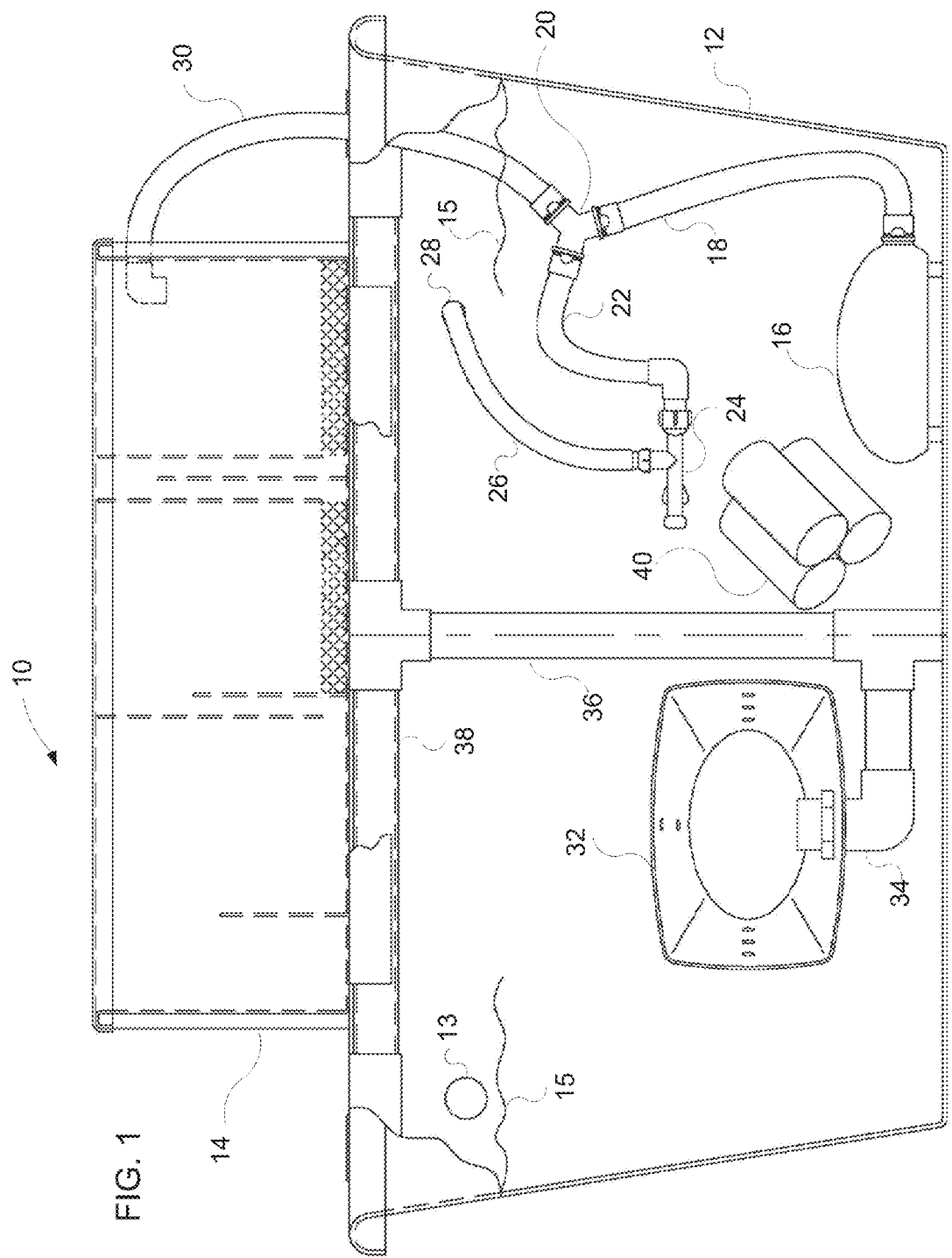
FIG. 1 illustrates a fish brooding and filtration system according to the teachings of the present disclosure.

Reference is made to FIG. 1, which shows a recirculating fish brooding and filtration system 10. The system 10 includes a brooding tank 12 and a filtration tank 14. The brooding tank 12 may be a lightweight thin-walled plastic tub. It may have any suitable volume but certain embodiments may include a 100 gallon capacity brooding tank 12. The brooding tank 12 may be dark in color for heat retention. A suitable 100 gallon brooding tank is a Stock Tank available from Rubbermaid® of Winchester, Va. The brooding tank 12 contains the components of the brooding system. The brooding tank 12 may include one or more overflow drain holes 13 that ensures that the water level 15 does not rise above a certain level causing the tank to overflow.

The brooding system includes a recirculating pump 16. The pump 16 draws in water from the brooding tank and pumps it through the conduits of the system 10. The recirculating pump 16 may be a relatively low power pump that is able to operate on a battery, standard outlet, or using solar power. The recirculating pump may be generally affordable allowing the entire recirculating fish brooding and filtration system 10 to be supplied to developing countries or poor locations that may be aided by brooding fish for food.

The recirculating pump 16 may be contained within a plastic globe. The plastic globe may have a plurality of holes that prevent large particles, such as mature fish or fish fry, from being drawn into the pump. The pump may also be contained in a nylon fine mesh bag. This may prevent fish eggs and fry from being drawn into the pump. In certain embodiments, the recirculating pump 16 may deliver a flow rate of 600 gallons (2,200 liters) per hour and use 32 watts of power.

The pump 16 causes the water to flow through a recirculating conduit 18 a tee connector or fitting 20. The tee connector 20 may be more "Y"-shaped as shown in FIG. 1. The tee fitting 20 splits the water from the recirculating conduit 18 into at least two paths. In the first path, the water leaves the tee fitting 20 and travels through an injector supply conduit 22. The injector supply conduit 22 delivers water into the injector 24. In the second path, the water travels through a filtration supply conduit 30 into the filtration tank 14.

The conduits and the tee fittings herein described may be available under the trade name Laguna. The conduits may be any suitably sized corrugated and flexible tubing. In certain embodiments, one-inch diameter conduit may be used for normal water flow and ¾ inch tubing may be used to increase the flow rate as the water enters the injector.

The injector 24 receives air through an air inlet conduit 26 that is then mixed with the water received from the injector supply conduit 22 and subsequently injected back into the water contained in the brooding tank 12. In certain embodiments, the injector 24 may be secured to a wall of the brooding tank 12 such that it injects the air water mixture directly into a volume of water. That is, the injector 24 may be all or partially submerged beneath the water level 15 in the brooding tank 12. By positioning the injector 24 along the sloped wall of the brooding tank 12, the injector 24 may deliver a uniformed distribution of oxygenated water which may help fish breeding, particularly tilapia. The air inlet conduit 26 receives fresh air because it is above the water level. In certain embodiments, an air conduit hole 28 may be formed in the brooding tank 12 to allow the air inlet conduit to protrude through the wall of the brooding tank 12. Specific features of the injector 24 are detailed further below.

The tee fitting 20 directs some of the water to a filtration supply conduit 30. The filtration supply conduit is coupled at one end to the tee fitting 20 and the other end extends from the top of the brooding tank 12 and is received in the filtration tank 14. In this manner, the water may be recirculated from the brooding tank 12 into the filtration tank 14 where it may be subject to various biofiltration processes. The biofiltration processes may extract and capture nutrients from the water, and the filtered water may be reintroduced into the brooding tank 12 to recirculate through the system 10.

Also contained in the brooding tank 12 is a cage 32 to contain the male fish stock. The male cage 32 may be supported by a cage support 34. The cage support 34 may be coupled to a filtration tank vertical support 36, which is coupled to a horizontal support 38, which supports a front end of the filtration tank 14 above the water level in the brooding tank 12 (see FIGS. 4 and 6). The filtration tank vertical support 36, the horizontal support 38, the cage support 34, and the connectors may be made of polyvinyl chloride "PVC" pipe and may be secured to each other using conventional permanent or temporary securing methods that are known in the art. The PVC pipe may be lightweight yet strong enough to support the filtration tank 14 and the cage support 34, and may also be easy to assemble on site.

The brooding tank 12 may also contain one or more female escape tubes 40. The female escape tubes 40 may allow the more vulnerable female fish to escape the more aggressive male fish which may harm or kill the female fish and impair the functionality of the brooding and filtration system 10. In certain embodiments, the female escape tubes 40 may be a plurality of sections of perforated drain pipe coupled together. In certain embodiments, three section of drain pipe may be secured together in a pyramid shape. The holes in the drain pipe may be large enough for the female fish to swim through, but may be small enough that the larger male fish cannot get through the holes. Thus, the female fish may be safe from the aggressive male fish inside the drain pipe.

Figure 2:
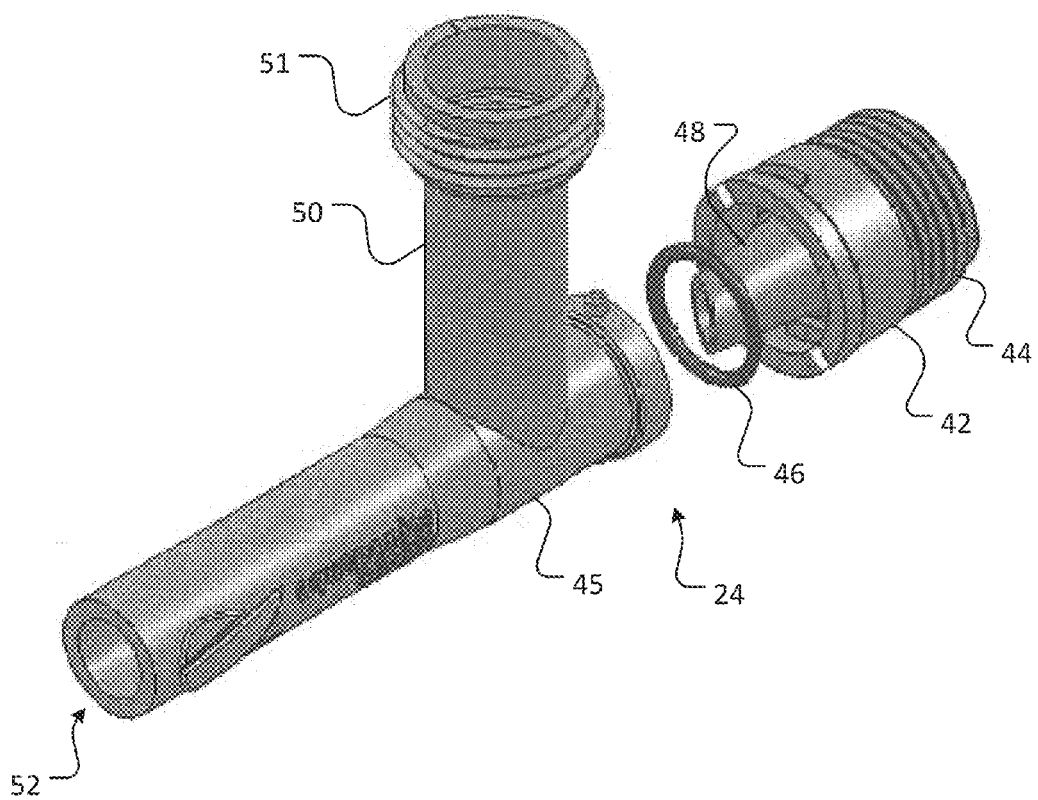
FIG. 2 illustrates an exploded isometric view of an injector assembly for a fish brooding and filtration system according to the teachings of the present disclosure.

Reference is made to FIG. 2, which is an exploded view of the injector assembly 24 shown in FIG. 1. The injector assembly 24 includes a flow accelerator 42 and an injector body 45, which may each be fabricated from a polymer material or any other suitable material, such as glass. The injector oxygenates the water to create a better environment for brooding fish. For example, microbial growth of beneficial bacteria used by the fish may be accelerated in oxygenated water.

The flow accelerator 42 is configured to be coupled to the injector supply conduit 22. Any suitable connection technique for making a fluid tight connection between fluid conduits or other components of a fluid circulation system may be employed according to the teaching of the present disclosure.

In the illustrated embodiment, the flow accelerator includes an external threaded connector 44. The flow accelerator 42 may be secured to the injector body 45 using any suitable connection technique. For example, in the illustrated embodiment, the flow accelerator 42 and the injector body 45 are connected via a pin/slot rotatable connection. In certain embodiments, a resilient polymer O-ring 46 may be compressed between the injector body 45 and the flow accelerator 42 to ensure a water tight seal. Other embodiments of the injector may not include an O-ring 46.

The flow accelerator 42 includes a nozzle 48, which increases the rate of water flow through the injector assembly 24 by decreasing the cross sectional area through which the water flows and relying at least partially on the Venturi effect. The increased water flow rate through the injector 24 serves to create a low pressure area within the injector body 45 that draws air from the air inlet conduit 26 to be received by an air inlet portion 50 of the injector body 45. In certain embodiments, the air inlet 50 may include a threaded portion 51 which may allow the air inlet conduit 26 to couple to the injector 24.

Although not illustrated, the air inlet 50 portion of the injector may include a flow valve that may be used to regulate the airflow into the injector 24. The valve may be any suitable valve that regulates air flow through a conduit. For example, the valve may be a flat valve that allows the air flow rate to be adjusted using a set screw. Thus, the air flow may be adjusted to create an appropriate ratio with the water volume and water flow rate through the injector 24. In addition, certain embodiments may include an airflow valve along the air inlet conduit 26 in addition or in lieu of a valve within the injector inlet portion 50, which may likewise be used to regulate the flow of air into the injector 24.

In the illustrated embodiment, the nozzle 48 may be integral with the flow accelerator 42 and may be coupled to the injector 24 by a pin and slot connection or other suitable connection technique. In this manner, the flow rate through the injector assembly 24 may be modified by connecting different flow accelerators 42 that include different sized nozzles 48 for creating different flow rates. Thus, the same injector body 45 may be coupled with different sized flow accelerators 42 to achieve the desired flow rate of water through the injector, which in turn affects the flow rate and the amount of air drawn through the air inlet portion 50 and injected into the water in the brooding tank 12. Thus, a low cost injector 24 with an easily adjusted flow rate may be provided according to the teachings of the present disclosure.

The flow accelerator 42 may be fabricated using known polymer forming processes, such as injection molding. In fabricating the flow accelerator 42, the nozzle 48 may be formed by inserting into the production tooling a part corresponding to the desired shape and opening in the nozzle 48. In this manner, the same production tooling may be used to fabricate flow accelerators 42 with a variety of different sized nozzles 48. Thus, the appropriate flow accelerator 42 may be selected for the injector assembly 24 based on the desired flow rate of water through the injector 24, which in turn affects the quantity of air that is drawn through the air inlet portion 50 of the injector 24 and injected to oxygenate the water in the brooding tank 12.

The water flowing through the nozzle 48 mixed with the air received through the air inlet 50 is delivered through an injector outlet 52 into the brooding tank 12. In this manner, oxygen may be injected into the volume of water in the brooding tank 12. The functionality of the injector to draw the air through the air inlet 50 via the Venturi effect may allow only a single recirculating pump 16 to be used with the system 10. A singular recirculating pump 16 may decrease the cost of the fish brooding and filtration system 10 making it particularly attractive for sustainability in impoverished regions.

The injector assembly 24 may be used with aquaponic systems other than the recirculating fish brooding and filtration system 10. In addition, the injector assembly 24 may be used to efficiently and economically introduce fresh air into fish tanks of all shapes and sizes. According to certain embodiments, multiple injectors can be fluidly connected to create a manifold for air injection into other aquatic systems, including fish habitats and swimming pools.

Figure 3:
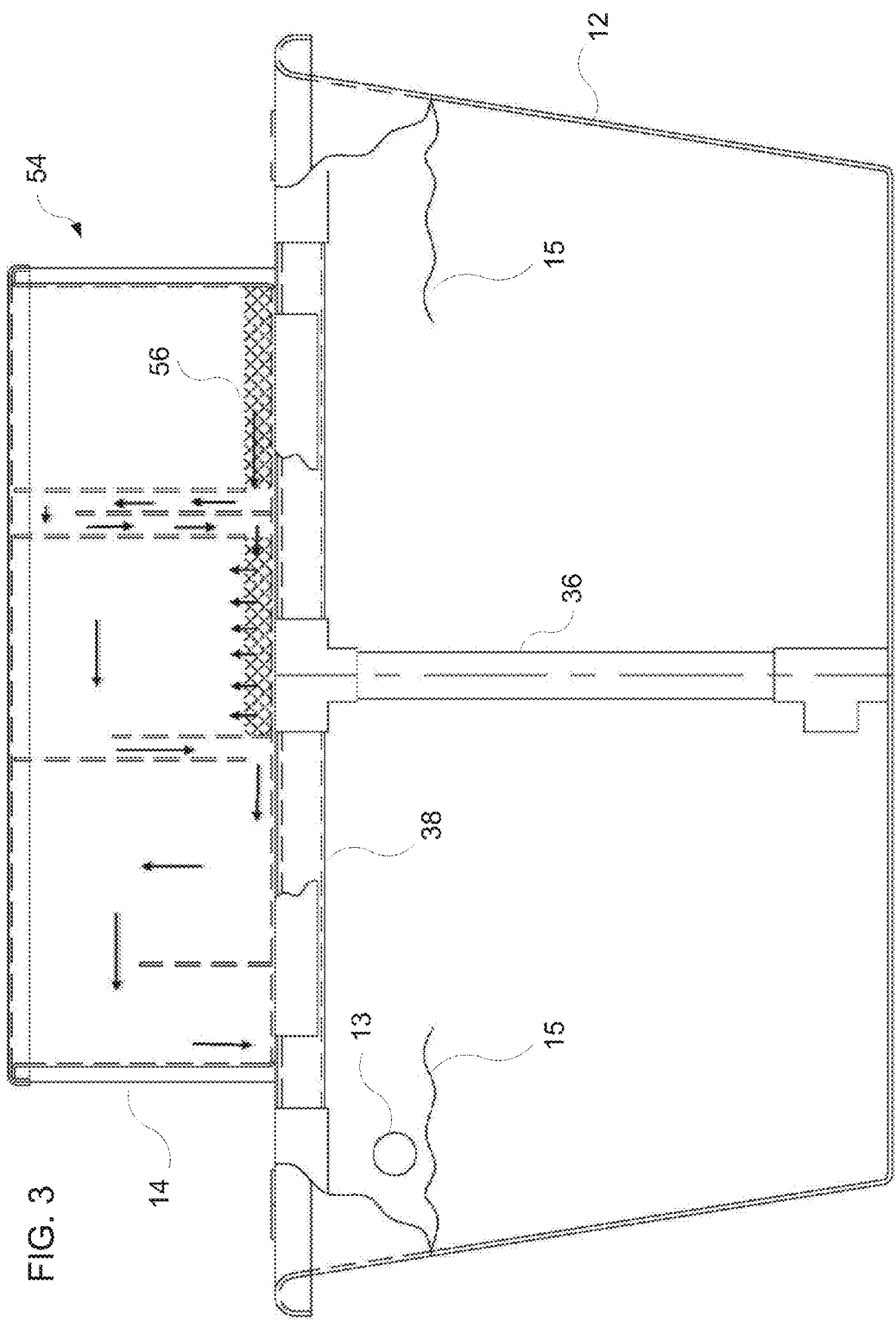
FIG. 3 illustrates a front view of a brooding tank, a filtration tank and a support structure of the fish brooding and filtration system of FIG. 1.
Figure 4:
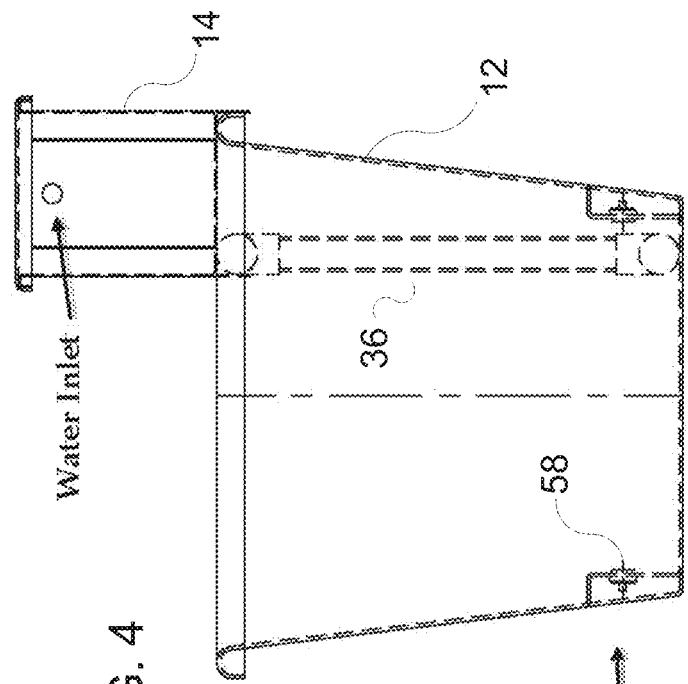
FIG. 4 illustrates a side view of the brooding tank, filtration tank and support structure of FIG. 3.
Figure 6:
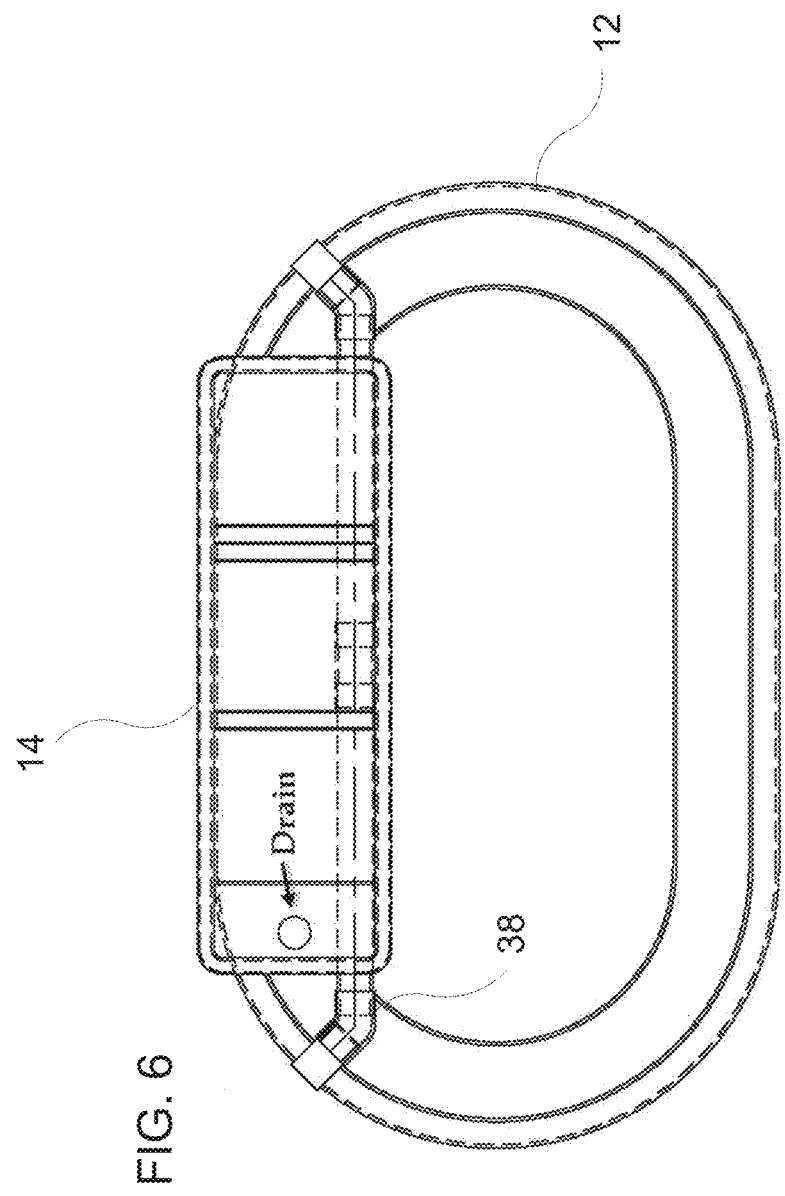
FIG. 6 illustrates a top view of the brooding tank, filtration tank and support structure of FIG. 3.

Reference is made to FIG. 3, which shows a portion of the fish brooding and filtration system 10. Specifically, the brooding tank 12, the support structure, and the filtration tank 14 are illustrated. The conduits, pumps, etc. shown in FIG. 1 have been removed for clarity. FIG. 4 illustrates a side-view of FIG. 3, and FIG. 6 illustrates a top-view.

Reference is made to FIG. 4, which shows the side-view of the tanks of the system 10. As illustrated, the filtration tank 14 may rest partially on a lip of the brooding tank 12, and the front portion of the filtration tank 14 may rest on the horizontal support 38 structure made of PVC pipe as previously described with respect to FIG. 1.

Figure 5:
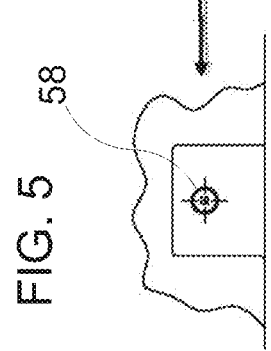
FIG. 5 illustrates a detailed view of a drain plug in the brooding tank of FIG. 4.

FIG. 5 illustrates a front-view of a drain plug of the brooding tank 12. The drain plug 58 may allow the water contained in the brooding tank 12 to be conveniently drained from the brooding tank 12, if the brooding tank 12 needs to be emptied so the system 10 may be disassembled for transport or storage. In certain embodiments, the brooding tank 12 may have a second drain plug through a rear wall of the brooding tank 12, as illustrated in FIG. 4.

Reference is again made to FIG. 3, which shows the filtration tank 14 and includes arrows indicating the general direction of fluid flow through the tank 14 during the biofiltration process. The filtration tank may be a three bay tank available under the Laguna trade name. For example, in certain embodiments the filtration tank 14 may be a Top Filter PT 771 from Laguna.

As illustrated, the filtration tank 14 may have three bays or compartments and within each bay, a substrate/mesh filter may be placed. Each substrate/mesh filter may serve a distinct and unique purpose for the entire biofiltration process. The water may be drawn through the filtration tank 14 due to the force of the spill down from the third compartment of this tank 14 back into the brooding tank 12. This spill/splash down creates a suction that draws the water through each compartment and mesh/substrate filter.

The biofiltration process may employ three filtration stages. In the first stage, water including uneaten fish food and other particles may be delivered from the filtration supply conduit into a first filtration section of the filtration tank 14. The first filtration section may include a Matala filter, which may filter out solid particles such as the fish food and similarly sized particles before the water is delivered to a second filtration section of the filtration tank 14. The second bay may filter in two different ways. This second compartment contains three different types of substrate/filters achieving two purposes. The second section may also employ an orange substrate-type filter. The orange substrate filter may facilitate the transformation of poisonous nitrites into non-poisonous nitrates by allowing millions of beneficial bacterial to colonize on the surface of the orange substrate. The billions of beneficial bacteria may function to transform poisonous nitrites into beneficial nitrates. In an end or drain portion of the filtration tank 14 (third filtration section), a third biofiltration process may occur, which employs a black bird netting substrate. The third process continues the process of transformation and filtration and has an evacuation drain hole allowing water to fall back into the brooding tank 12 creating a splashdown oxygenation effect. The water flows into the third compartment with a similar system as the second for additional biofiltration. This third compartment has a hole at the bottom where the water evacuates the biofiltration unit creating a splash down effect. This splash down affect delivers more oxygen into the tank water due in part to the placement of the filtration tank 14, which is approximately six inches above the water level of the brooding tank 14.

Figure 7:
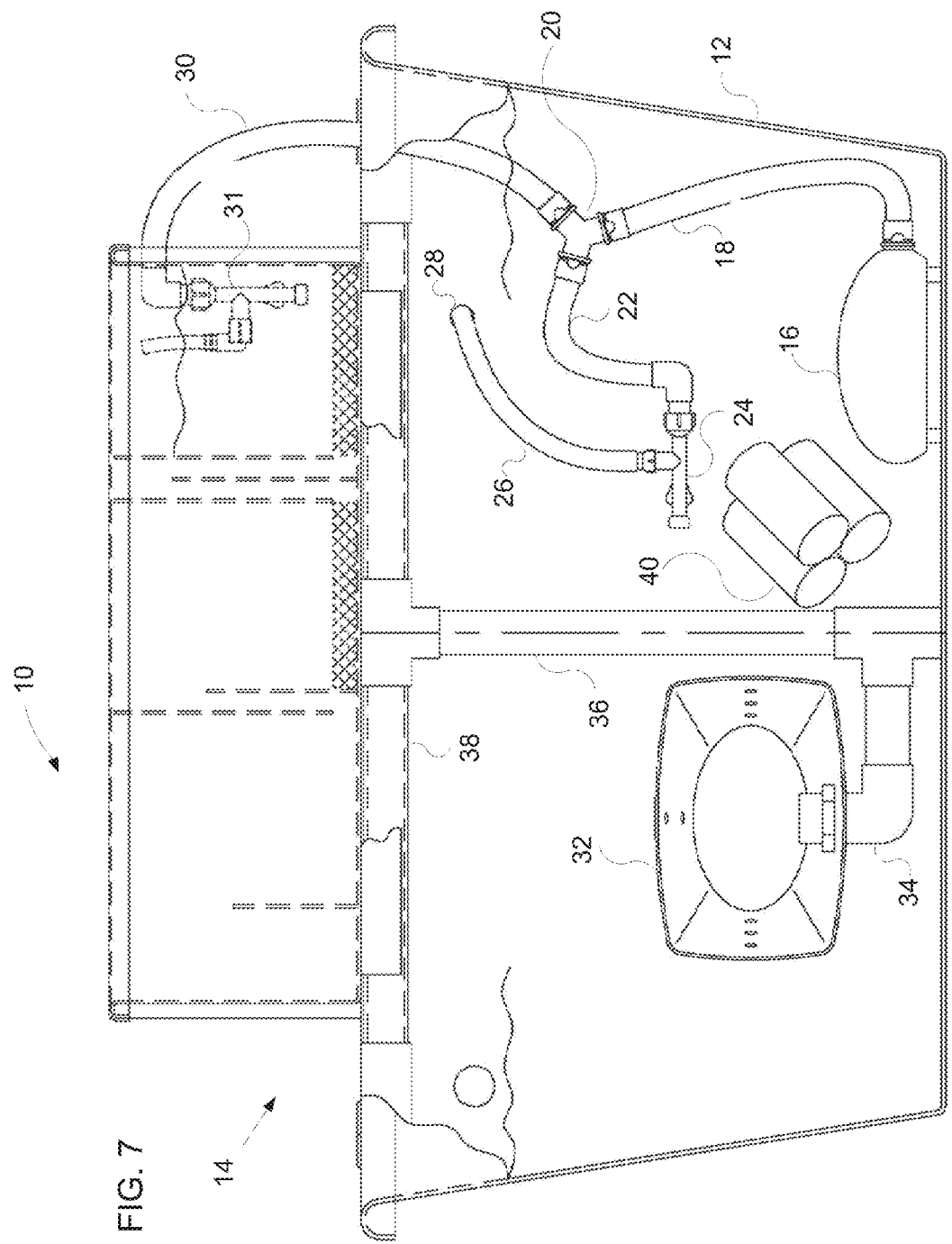
FIG. 7 illustrates a dual-injector embodiment of a fish brooding and filtration system according to the teachings of the present disclosure.

FIG. 7 illustrates an alternate embodiment of the system 10 having a second injector 31 submerged in the filtration tank 14. The second injector 31 may be substantially the same as the injector 24 described above. The additional injector serves to further oxygenate the water circulating through the system 10 for improved fish brooding and harvesting.

The components of the system may be assembled and disassembled with few or no tools. Locating the system 10 in a temperature controlled environment may enhance fish brooding and filtration. In addition, a heater may be added. In certain embodiments, the heater may be an approximately 300 Watt heater. The heater may enhance breeding by heating the recirculating water causing the male fish to become more active and breed more aggressively.

Certain embodiments may include a low wattage grow light (not shown). The grow light may provide light for growing algae if the system 10 is located in an area that receives less or no direct sunlight. The grow light may also provide the fish with simulated sunlight, which is conducive to breeding.

After assembling the system as shown in FIG. 1, the brooding tank may be filled to a predetermined water level 15. This initial filling may be used to confirm that the recirculation system 10 is operational and sever to remove any residue from packaging. The system 10 may be allowed to recirculate water for approximately two hours. After the initial recirculation operation, the system may be drained and refilled. Water may be filtered with a pre-filter before refilling the brooding tank 12.

After the tank 12 is refilled, the system may be seeded. The process of seeding the tank may take approximately seven days. Seeding may be accomplished by adding a quantity of algae growing fertilizer to the system 10. The seeded system may be allowed to circulate for approximately one hour. In addition, fish water and/or nitrate water from a bio-filter may be added to the system.

Next, a batch of test fish may be introduced into the system. The water temperature should be tested to ensure a suitable temperature for the introduction of test fish. These test fish may provide enough ammonia to initiate the nitrogen cycle that may cause the filtration tank 14 to begin being colonized with beneficial microbes for the biofiltration process. Using test fish to initiate the filtration process may allow confirmation of the filtration functionality of the system 10 without risking the more expensive stock fish. The test fish may be gold fish that may be purchased at a pet store or may be cheaper Tilapia fish. The test fish will be removed from the system 10 and replaced with the brood stock once proper breeding conditions are determined. Proper breeding conditions may include proper water temperature and suitable PH and ammonia levels. In some embodiments, a test-kit may be used to ensure proper breeding conditions of the system 10. This nitrogen cycle should circulate for at least seven days. The temperature of the water in the system 10 should be maintained between 82 and 87 degrees Fahrenheit.

The temperature of the brood stock should be approximately equal to the temperature of the water in the system 10. This is achieved by simply placing the brood stock into a see-through plastic bag filled with the water. The bags may be placed in the brooding tank and allowed to float until the temperature is within 3 to 5 degrees difference (may take about an hour). After the temperature has been reached, the bags may be opened and the brood stock fish may swim into their new environment. The brood stock may consist of five females and two males of any suitable species. In certain embodiment, the brood stock may be tilapia.

Care should be taken in handling the brood stock, as the larger they are the more fragile they become. Care also should be taken to avoid over handling and stressing the stock. Before the brood stock is released, the escape female escape tubes 40 should be in place and operational. The male fish have a tendency to bite females and potentially kill them. Also, additional water may be introduced into the system 10 to maintain the predetermined water level because of naturally occurring evaporation. The system, particularly the brooding tank 12 should be cleaned once a week during normal breeding operations. According to one embodiment, an ozonator may be used to clean the system once every two weeks or as needed. The ozonator may eliminate the need to drain the tanks to clean the system.

Water from the third bay of the filtration tank may be extracted and used to water plant life or for other purposes. For example, the nutrient rich filtered fish waste water may be used for gardening, compost tea, compost piles, etc. In addition, the unfiltered fish water or fish water extracted from other filtration bays may also be used for sustainability purposes.

Figure 8:
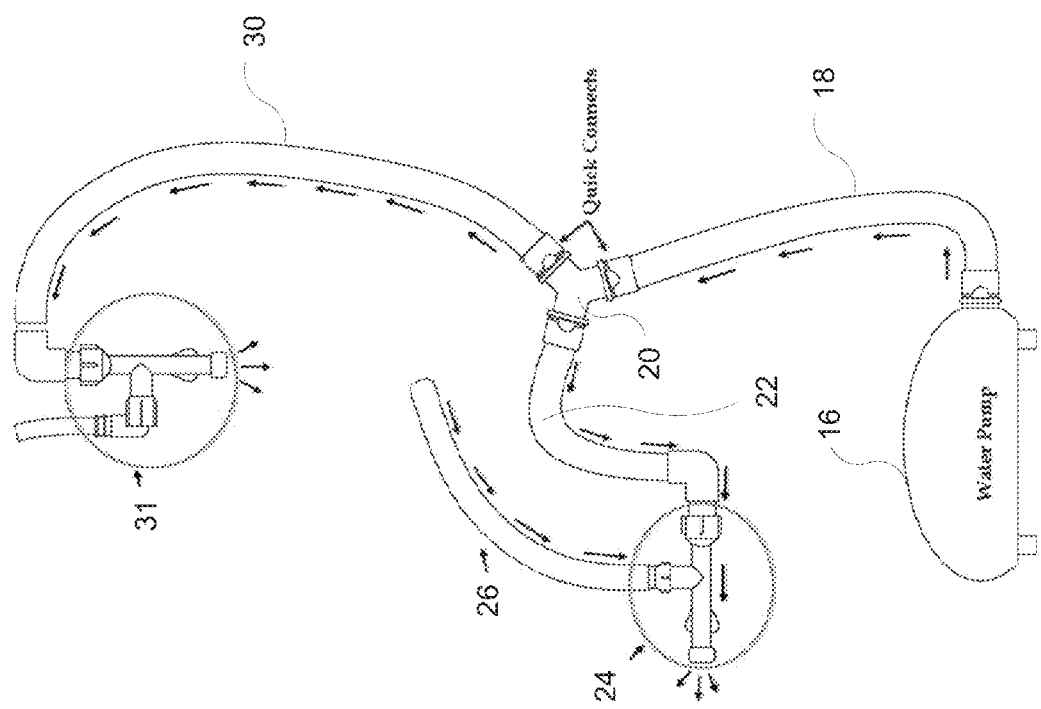
FIG. 8 is a detailed view of a circulation system portion of the embodiment of the fish brooding and filtration system of FIG. 7.

Reference is made to FIG. 8, which is a detailed view of the conduit portion of the fish brooding and filtration system 10 shown in FIG. 7. The arrows indicate the direction of fluid flow during operation of the system 10 as described herein.

Although preferred embodiments of the method and apparatus of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A fish brooding and filtration system, comprising:
    a brooding tank configured to contain water and fish for breeding;
    a filtration tank in fluid communication with the brooding tank, the filtration tank configured to extract nitrites from the water circulating through the system;
    a support structure supporting the filtration tank above the brooding tank; and
    a pump configured to circulate the water through at least one conduit and an injector, the injector operable to receive a flow of the water generated by the pump and to draw air into the injector, the injector further operable to inject a mixture of the drawn air and the water into the brooding tank.

2. The system of claim 1 wherein the injector comprises:
    an injector body including an air inlet portion configured to receive the air; and
    a nozzle coupled to the injector body and coupled to the at least one conduit, the nozzle being configured to accelerate a flow of the water through the injector.

3. The system of claim 2 wherein the nozzle is removably connected to the injector body.

4. The system of claim 3 wherein a pin/slot connection connects the nozzle to the injector body.

5. The system of claim 1 further comprising a tee fitting coupled to the conduit, the water flowing through the tee fitting before being received by the injector.

6. The system of claim 1 wherein the injector is secured to a wall of the brooding tank.

7. The system of claim 1 further comprising a second injector configured to deliver an air and water mixture into the filtration tank.

8. The system of claim 1 wherein the support structure comprises polyvinyl chloride ("PVC") pipes.

9. The system of claim 1 wherein the fish brooding and filtration system uses only a single pump.

10. The system of claim 9 wherein the single pump operates using approximately 300 Watts of power or less.

11. A method for brooding fish, comprising:
    introducing stock fish into water in a brooding tank;
    circulating the water through at least three stages of filtration of a filtration tank to filter the water and using bacteria to convert harmful nitrites in the water into beneficial nitrates; and
    drawing air into an injector using a flow of the water through the injector; and
    injecting the air and water mixture into the water in the brooding tank for oxygenation.

12. The method of claim 11 wherein the water drains from a third filtration stage into the brooding tank.

13. The method of claim 12 wherein the draining of the water draws the water through the at least three stages of filtration.

14. A fish brooding and biofiltration system, comprising:
    a brooding tank containing water and fish for breeding;
    a biofiltration tank in fluid communication with the brooding tank, the biofiltration tank having at least three filtration stages and at least one stage extracting nitrites from the water circulating through the system;
    a pump circulating the water through at least one conduit and an injector and a tee fitting, the injector receiving a flow of the water generated by the pump and the flow of water drawing air into the injector, the injector injecting a mixture of the drawn air and the water into the brooding tank, the injector comprising:
        an injector body including an air inlet portion configured to receive the air; and
        a nozzle coupled to the injector body and coupled to the at least one conduit, the nozzle being configured to accelerate a flow of the water through the injector.

15. The system of claim 14 wherein the fish brooding and biofiltration system uses only a single to pump the water.

16. The system of claim 15 wherein the single pump operates using approximately 300 Watts of power or less.

* * * * *